United States Patent [19]
Diethelm

[11] Patent Number: 5,212,023
[45] Date of Patent: May 18, 1993

[54] SOLID ELECTROLYTIC FUEL CELL AND METHOD OF DISSIPATING HEAT THEREIN

[75] Inventor: Roland Diethelm, Winterthur, Switzerland

[73] Assignee: Sulzer Brothers Limited, Winterthur, Switzerland

[21] Appl. No.: 739,898

[22] Filed: Aug. 2, 1991

[30] Foreign Application Priority Data

Aug. 27, 1990 [SW] Switzerland .......................... 2-769

[51] Int. Cl.$^5$ ........................................... H01M 8/04
[52] U.S. Cl. ........................................ 429/26; 429/30
[58] Field of Search ............................... 429/26, 30

[56] References Cited

U.S. PATENT DOCUMENTS

| | | |
|---|---|---|
| 3,394,032 | 7/1968 | Danner . |
| 3,523,830 | 8/1970 | Baker et al. . |
| 4,169,917 | 10/1979 | Baker et al. . |
| 4,476,198 | 10/1984 | Ackerman et al. . |
| 4,490,442 | 12/1984 | Maru et al. . |
| 4,490,445 | 12/1984 | Hsu . |
| 4,520,082 | 5/1985 | Makiel .................................. 429/26 |
| 4,735,872 | 4/1988 | Maimoni ......................... 429/26 X |
| 4,874,678 | 10/1989 | Reichner ............................... 429/30 |
| 4,910,100 | 3/1990 | Nakanishi et al. ............... 429/39 X |

OTHER PUBLICATIONS

Patent Abstracts of Japan, Band 12, Nr. 385 (E-668)(3232), Oct. 14, 1988, and Japan 63128559.
Patent Abstracts of Japan, Band 10, Nr. 39 (E-381)(2096), Feb. 15, 1986 and Japan 60195880.
Patent Abstracts of Japan, Band 6, Nr. 155 (E-125)(1033), Aug. 17, 1982 and Japan 5776766.
Patent Abstracts of Japan, Band 10, Nr. 347 (E-457)(2403), Nov. 21, 1986 and Japan 61148768.

*Primary Examiner*—Stephen Kalafut
*Attorney, Agent, or Firm*—Kenyon & Kenyon

[57] ABSTRACT

A battery of solid electrolytic fuel cells is provided with heat conductive temperature equalizing members disposed in alternating relation with electrochemically electrode active structures of the fuel cells. The heat produced by the electrochemical reaction is dissipated by the air which is applied to the fuel cells to provide the oxygen required for the reactions. The transfer of the heat of reaction to the air is largely brought about before the air comes into contact with the electrochemically active structures. The transfer of heat from the electrochemically active structures to the equalizing members occurs mainly by thermal radiation whereas heat is transferred from the equalizing members to the air by heat conduction.

14 Claims, 4 Drawing Sheets

SOLID ELECTROLYTIC FUEL CELL AND METHOD OF DISSIPATING HEAT THEREIN

This invention relates to a solid electrolytic fuel cell and to a method of dissipating heat therein.

As is known, solid electrolytic fuel cells have been constructed such that a fuel gas, which mainly consists of hydrogen and/or carbon monoxide and/or methane, reacts on a laminar negative electrode (anode) with oxygen ions, with water and/or carbon dioxide being formed and electrons being released. The oxygen comes from air, the oxygen molecules of which are dissociated and ionised at a laminar positive electrode (cathode). The oxygen ions diffuse through a solid electrolyte, which lies as a thin, gastight layer between the two porous, laminar electrodes, and which can conduct oxide ions at elevated temperatures (over approx. 1100°K). Various types of solid electrolytic fuel cells are known (see, for example, Brian Riley "Solid Oxide Fuel Cells the Next Stage" in Journal of Power Sources, 29 (1990) 223-237). Hereinafter, the solid electrolytic fuel cell will be called "fuel cell" or simply "cell" for short and the fuel gas will be called simply "gas".

With the known methods for operating fuel cells, the incident heat of reaction is absorbed by the air supplying the oxygen and discharged into the waste gas. To ensure that excessive temperature differences do not occur in the fuel cell, a large amount of excess air has to be supplied. Customarily, five times as much air as is required for the reaction is used. Despite this large amount of excess air, the difference between the outlet and inlet temperature is still approximately 200°K, which results in difficult constructive problems because of the thermal stresses occurring in the solid electrolytes which are usually made of ceramic.

So that the heat of reaction can be eliminated from the "electrochemically active structures" i.e. a solid electrolyte having the two electrode layers—at the necessary high temperature, the air has to be heated to approximately 800° Celsius (or roughly 1100°K) before being fed into the fuel cells. Generally, this takes place in a recuperator, in which heat is reclaimed from the waste gas. As a large amount of excess air is required, recuperators are necessary, to which a considerable proportion of the construction costs has to be allocated.

Accordingly, it is an object of the invention to create a heat balance in a fuel cell battery so that the smallest possible thermal stresses occur with the smallest possible amount of excess air. It is another object of the invention to be able to operate a solid fuel cell battery with a reduced amount of excess air.

It is another object of the invention to reduce the costs required for constructing a solid fuel cell battery.

It is another object of the invention to reduce the thermal stresses within a solid fuel cell battery.

Briefly, the invention provides a method of dissipating heat from a battery of solid electrolytic fuel cells as well as a solid electrolytic fuel cell which can operate at reduced thermal stresses and costs.

In accordance with the method, a temperature equalizing member is positioned opposite a positive electrode of an electrochemically active structure of at least one fuel cell in order to receive generated heat therefrom during a conversion of chemical energy into electrical energy. In addition, a first part of the heat transferred to the temperature equalizing member is dissipated indirectly to a flow of air via heat exchange elements while a second part of the heat transferred to the temperature equalizing member is dissipated directly to the flow of air in order to heat the air to a temperature close to the temperature of reaction. Thereafter, the flow of heated air is passed to the positive electrode of the electrochemically active structure.

In accordance with the invention, a flow of oxygen having at most a three fold excess can be supplied with the flow of air. Further, the heat transferred, indirectly and directly from the equalizing member, may be dissipated in at least approximately equal parts.

Where used to dissipate the heat from a battery of fuel cells, the flow of heated air is passed over a positive electrode of each of the fuel cells at the same temperature or close thereto.

A third part of the heat transfer to the temperature equalizing member may also be dissipated into a flow of fuel gas which is passed to the electrochemically active structure in order to preheat the fuel gas.

In accordance with the invention, the fuel cell comprises an electrochemically active structure including a positive electrode and a negative electrode, means for directing a flow of fuel gas over the negative electrode and means for directing a flow of air over the positive electrode. In addition, the heat conductive temperature equalizing member is provided for receiving heat generated in the structure and is disposed in heat exchange relation with the flow of air in order to preheat the flow of air prior to passage over the positive electrode. In addition, heat exchange elements are disposed between the temperature equalizing member and the flow of air for pre-heating the flow of air with the heat obtained from the equalizing member.

The electrochemically active structure also includes an electrolyte between the two electrodes. In addition, a heat conductive temperature equalizing member is disposed opposite the positive electrode in order to receive generated heat therefrom. Further, the means for directing a flow of air may include a plurality of parallel cavities and the member, is provided to define at least one flow path for the flow of air on one side of the temperature equalizing member remote from the positive cathode. In this case, the flow path is disposed to transfer one part of the heat transferred to the equalizing member directly to the flow of air.

The heat exchange elements also provided in the flow path for dissipating another part of the heat transfer to the equalizing member are typically positioned at an inlet end of the flow path to preheat the air being delivered into the flow path.

A second means, such as a plurality of parallel cavities in the equalizing member, is also provided to define at least one flow path for the flow of heated air between the equalizing member and the positive cathode. In this case, the two sets of parallel cavities communicate directly with each other.

In one embodiment, the active structure and temperature equalizing member are of annular shape with a plurality of such components being stacked in vertical array in spaced apart relation. In this embodiment, each equalizing member is spaced from one active structure to define a flow path for a fuel gas therebetween while being spaced from a second active structure to define a flow path for air therebetween. In addition, a central pipe may be disposed coaxially of the annular components with holes to communicate with the flow path for the fuel gas in order to deliver a fuel gas thereto.

In still another embodiment, the electrochemically active structure may be disposed between an air duct and a fuel gas duct. In this case, a tubular element is disposed in the air duct for receiving heat generated from the structure which also defines a flow path for a flow of air to be heated therein. A seal is provided at one end of the air duct for redirecting a flow of air exiting from the tubular element to between the element and the positive electrode of the electrochemically active structure. In addition, a wire-shaped element is disposed in the fuel gas duct for receiving heat generated from the electrochemically active structure.

The fuel cell has several important advantages. First, as the fuel cells can be operated with a reduced amount of excess air, the construction costs are reduced due to smaller recuperators. A double to treble amount of excess air is sufficient compared with the fivefold amount previously required. Despite this reduced amount of excess air, temperature differences which are smaller than or at least not substantially greater than 20°K are produced due to the temperature equalising members in the electrochemically active structures. Less critical thermal stresses result from this.

These and other objects and advantages of the invention will become more apparent from the following detailed description taken in conjunction with the accompany drawings wherein.

Figure 2:
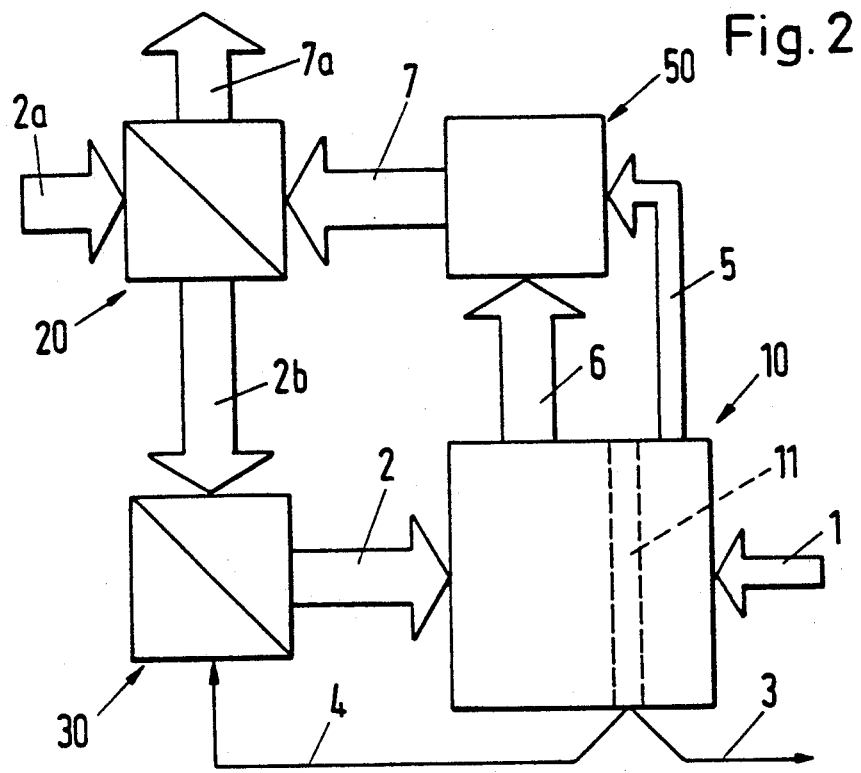
Figure 3:
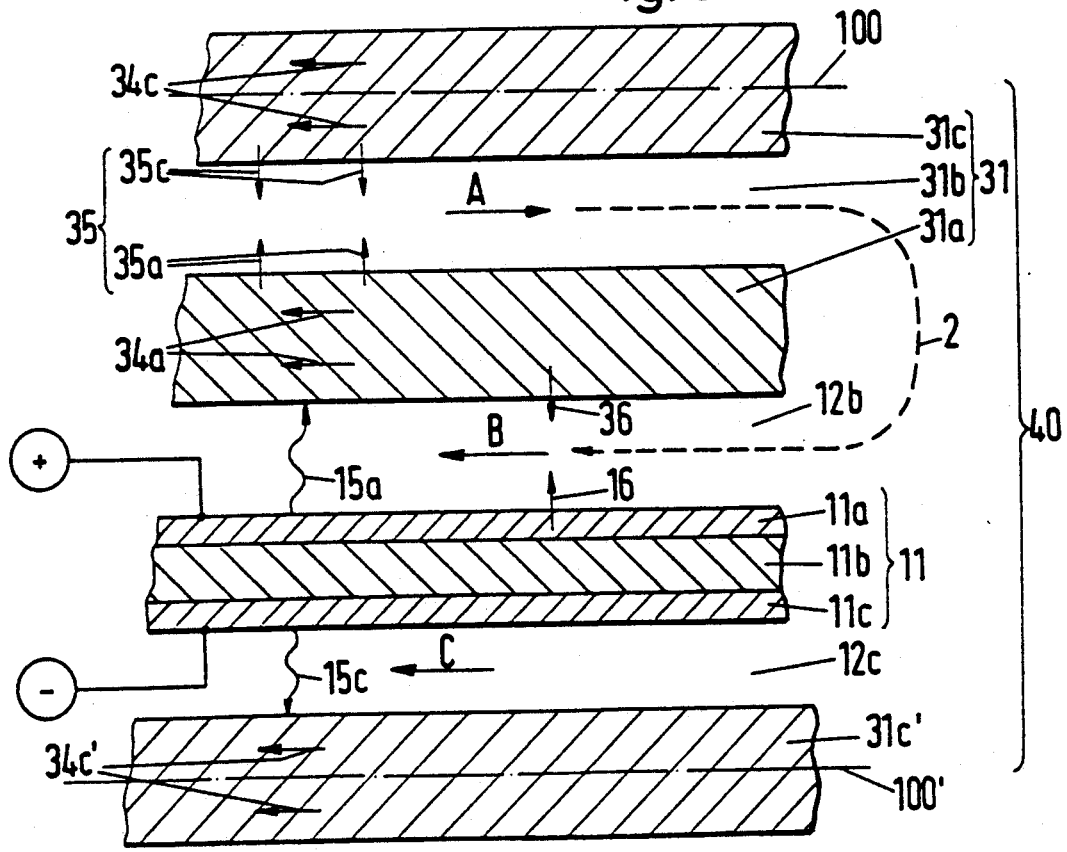
Figure 4:
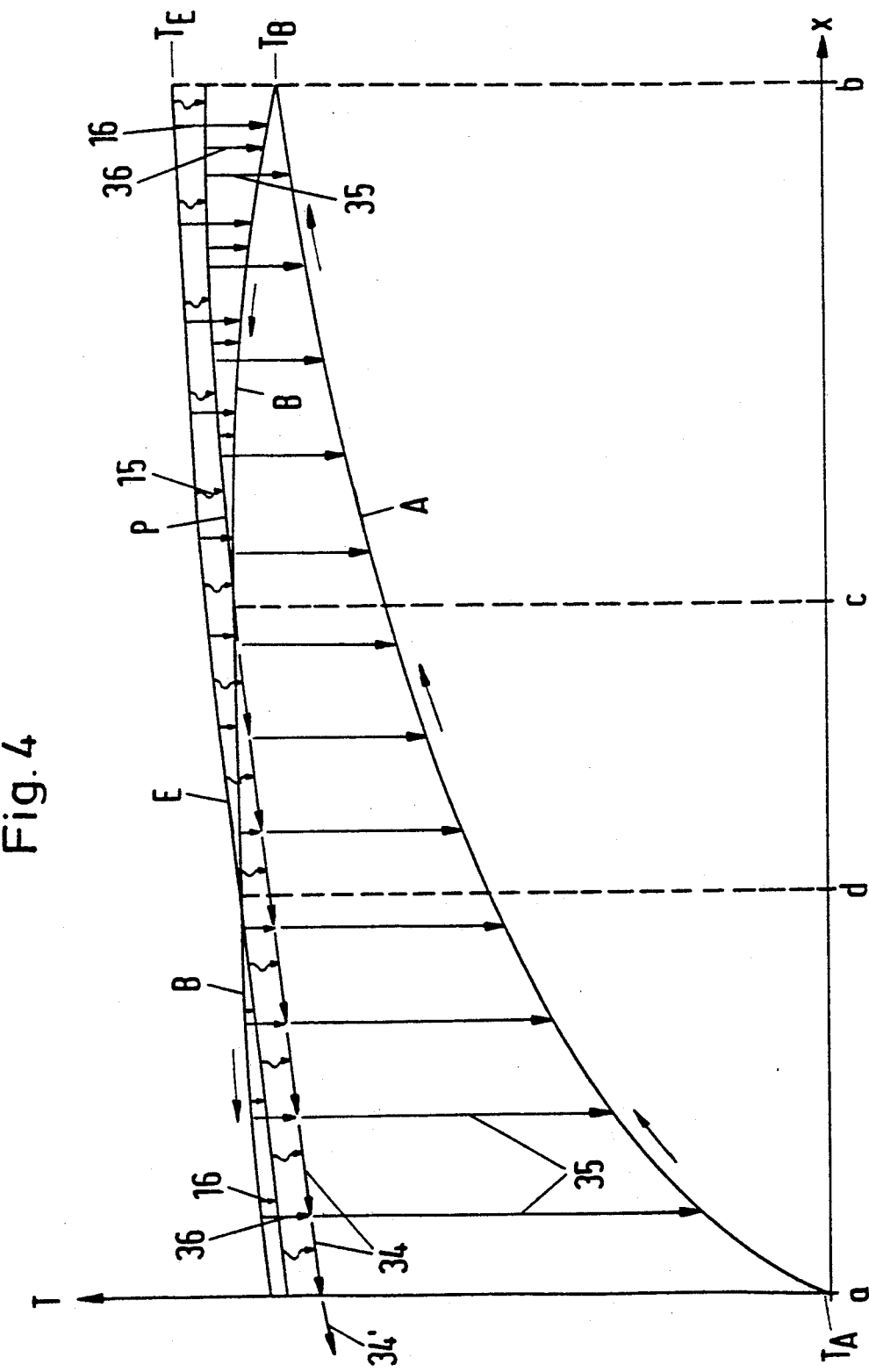
Figure 5:
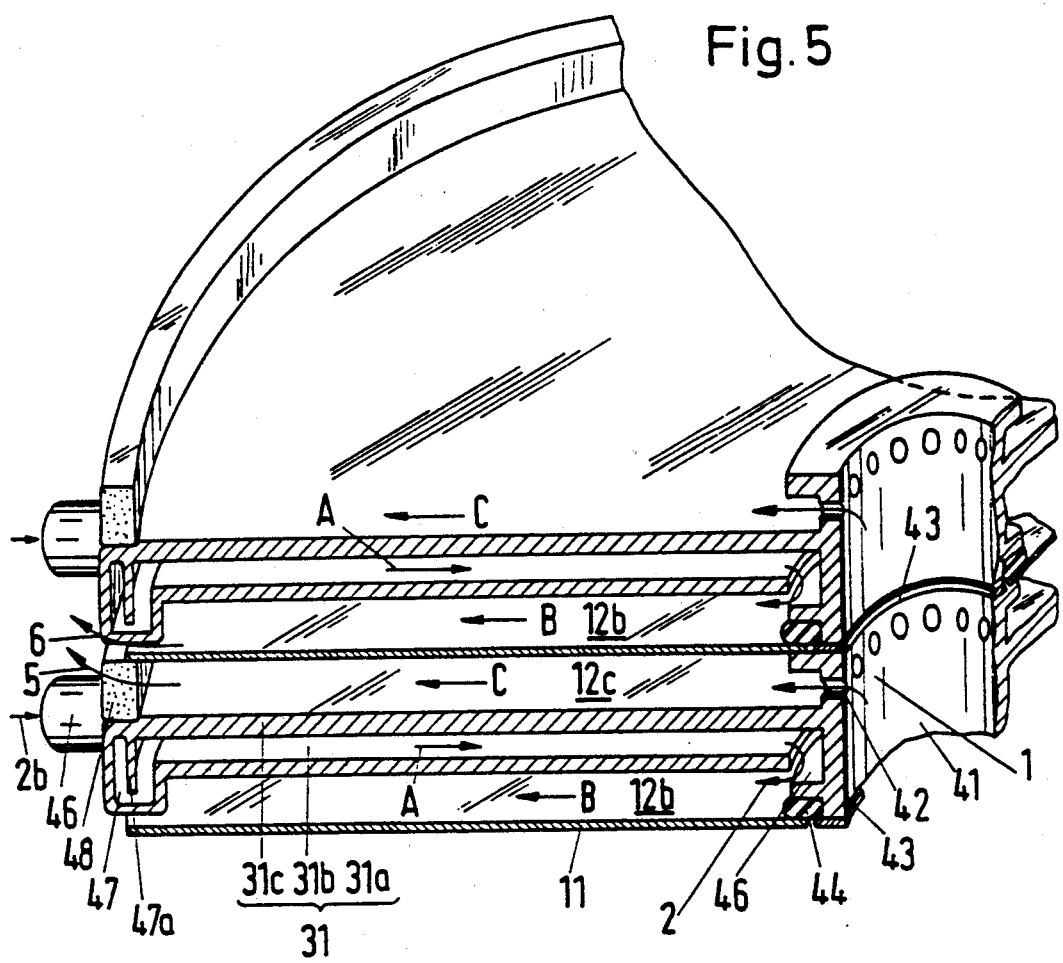
Figure 6:
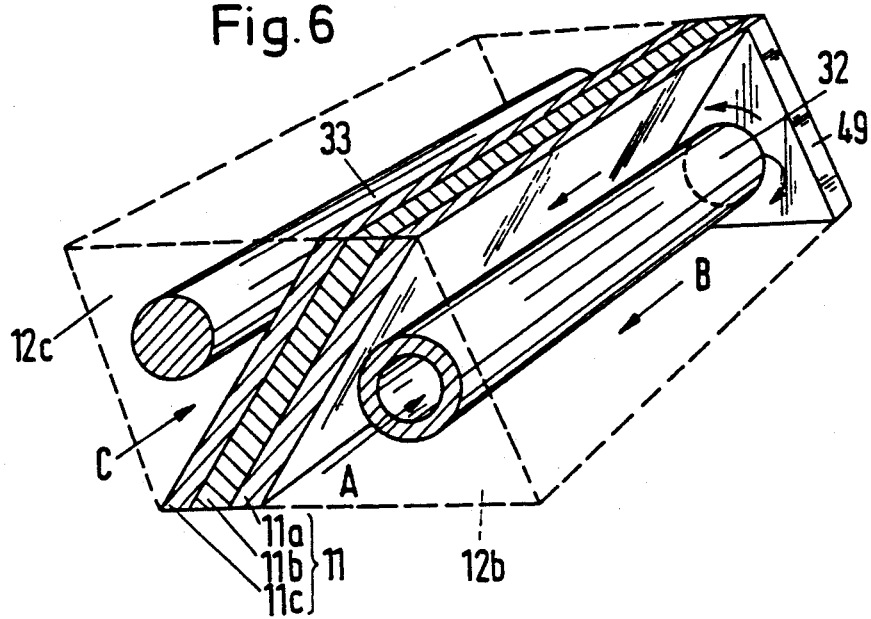

FIG. 2 schematically illustrates a heat balance diagram of a fuel cell constructed in accordance with the invention;

FIG. 3 illustrates a cross sectional view of a fuel cell having temperature equalizing members in accordance with the invention;

FIG. 4 graphically illustrates the temperature and thermal flow conditions in a fuel cell constructed in accordance with FIG. 3;

FIG. 5 illustrates one embodiment of a fuel cell battery of annular construction in accordance with the invention; and FIG. 6 illustrates a modified fuel cell construction in accordance with the invention.

Figure 1A:
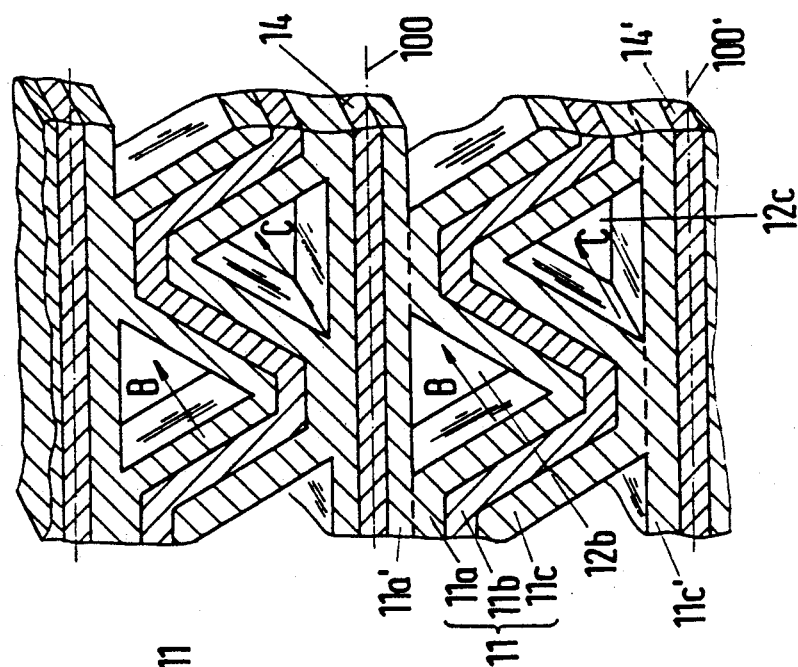
FIG. 1a illustrates a perspective view of a known fuel cell having air passages and fuel gas passages disposed in crossing relation.

Referring to FIG. 1a, the known fuel cell comprises electrochemically active structures 11, which are extended level and flat and consist of a cathode 11a, solid electrolyte 11b and an anode 11c. Air (arrows B) is guided through ducts 12b in an x-direction via the cathode 11a, while a gas (arrows C) is guided through ducts 12c in a y-direction via the anode 11c. The ducts 12b and 12c are groove-like channels on both sides of a so-called "bipolar separator plate" 12. This separator plate 12 is electrically conductive.

The fuel cell battery shown in FIG. 1a consists of a stack of separator plates 12, 12' and electrochemically active structures 11, 11', which are layered alternately one on top of the other in the z-direction and which all have the same rectangular surface (surface area F). Distributors and collectors (not shown) for the air or the gas, as appropriate, are disposed on the four sides of the stack parallel to the z-direction. The stack is closed on the lower side and correspondingly on the upper side by an end plate 13. The electrical current produced in the battery flows in the z-direction and is proportional to the surface area F. The battery voltage is proportional to the number of cells, with one cell comprising the zone limited by the two dot-dash lines 100 and 100'.

Figure 1B:
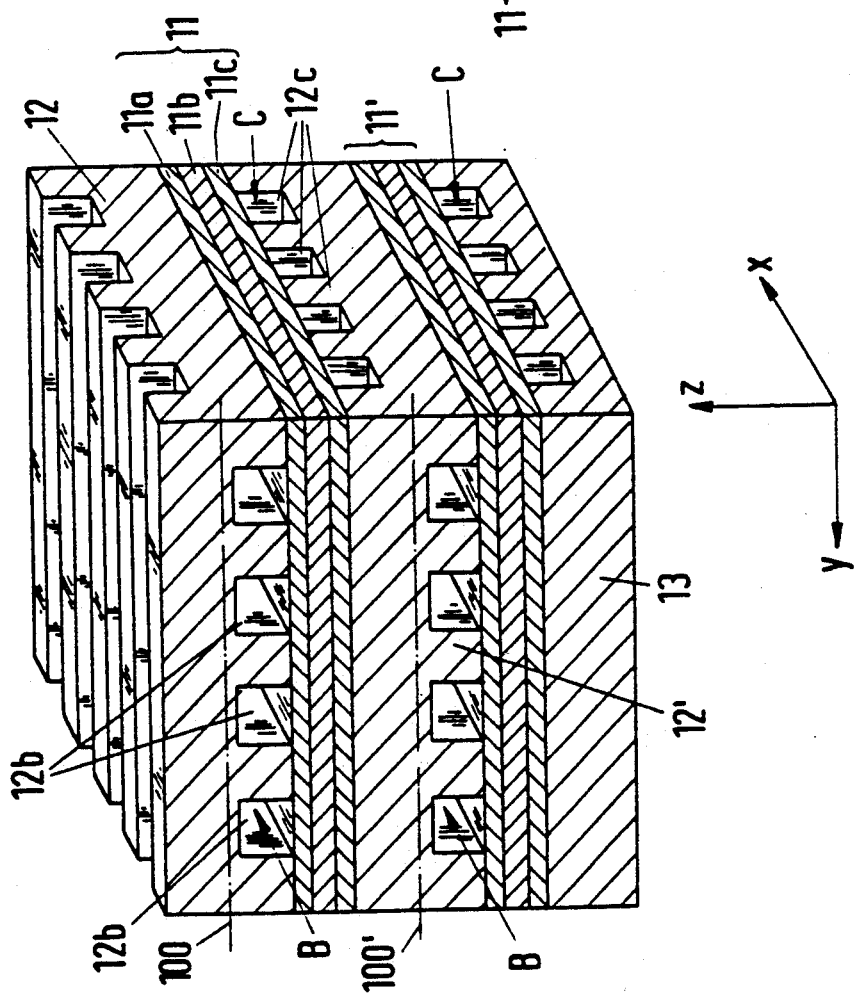
FIG. 1b illustrates a segmental view of a known fuel cell having air and gas passages disposed in parallel.

In the fuel cell battery shown in FIG. 1b, which is also a stack of cells, the electrochemically active structures 11 are also extended flat; however they are also corrugated at right angles to one direction (the x-direction). As a result, the air ducts 12b and gas ducts 12c are parallel to one another. Layers 11a' and 11c' of electrode material are attached—depending on the adjacent electrode—to the structure 11, as a result of which the ducts 12b and 12c become tubular. Adjacent cells, in which the boundary lines 100 or 100' are also marked with dot-dash lines, have electrically conductive intermediate layers 14, 14'. As all ducts are parallel, the distributors and collectors for the air and gas have to be disposed on the same side of the stack (at right angles to the x-direction), and this necessitates a somewhat more complicated construction in comparison with the cross current device shown in FIG. 1a.

Referring to FIG. 2, in accordance with the invention, a fuel cell 10 having flatly extended electrochemically active structures, as above, is connected in a heat balance arrangement as illustrated.

As shown the fuel cell 10 is supplied with a flow of gas 1 and a flow of oxygen from the air 2 which react at the electrodes of the electrochemically active structure 11, with the chemical energy being converted into electrical energy 3 and heat 4. With a very good fuel cell, approximately the same amount of both energy types is produced. The gas consumed 5, of which approximately 15% is not yet oxidised, travels together with the air 6 leaving the fuel cell 10, the temperature of which is roughly 800 degrees Celsius, into a secondary combustion chamber 50, where waste gas 7 with a temperature of 1,000° C., for example, is produced. With this hot waste gas 7, a flow of fresh air 2a is heated to approximately 600° C. in a recuperator, the "external recuperator" 20. The waste gas 7a, which is partially cooled during this process, may be supplied for another heating operation. The heated fresh air 2b is heated with the heat of reaction 4 to practically reaction temperature in an "internal recuperator" 30, to which the temperature equalising members belong, and in this condition they are supplied to the cathode.

The fresh air 2b, which has been preheated in the external recuperator 20, passes heat exchange elements on entering the fuel cell 10, as specified in more detail below as an exemplified embodiment in connection with FIG. 5. These heat exchange elements are fed by heat from the temperature equalising members, with them heating the air 2b further to approx. 700° C. The air 2b then comes into contact with the equalising members, as a result of which the air temperature is further increased. The thermal flow conditions which result are explained with reference to FIG. 3.

Referring to FIG. 3, a fuel cell 40 with a temperature equalising member 31 could be used, for example, in the fuel cell battery as shown in FIG. 5. The equalising member 31 consists of two parallel plates 31a and 31c, with the one 31c or the corresponding plate 31c' of the adjacent cell forming partitions in the fuel cells. The center lines 100 and 100' of these partitions are the boundaries of the fuel cell 40. The air A, which flows in a cavity 31b between the two plates 31a, 31c is first passed over heat exchange elements (not shown) at the air intake points of the fuel cell and is heated practically to reaction temperature. The air heated in this way is conveyed into the cathode chamber 12b between the electrochemically active structure 11 and the plate 31a and flows as shown by arrow B along the cathode 11a. Arrow C signifies the flow of gas in the anode chamber 12c along an anode 11c. Driven by the electrochemical reaction, oxygen ions wander from the positive side (plus sign) through the solid electrolytes 11b to the negative side (minus sign) and thus produce the electromotive force for the fuel cell.

The heat transfer conditions in the fuel cell 40 are shown by various arrows in FIG. 3: heat conduction 34a, 34c and 34c' in plates 31a, 31c and 31c' respectively in the direction of the air inlet; heat transfer 35a, 35c from plate 31a or 31c respectively to air stream A; heat transfer 36, 16 from plate 31a or cathode 11a respectively to air stream B; thermal radiation 15a from cathode 11a to plate 31a and thermal radiation 15c from anode 11c to plate 31c' (plate 31c absorbs corresponding thermal radiation from the adjacent cell).

The heat produced by the electrochemical reaction is mainly indirectly transferred by heat conduction via the equalising members 31 to the air. First, the heat of reaction is transferred mainly by thermal radiation to the equalising members 31; the heat conduction into and through the cathode chamber 12b or the anode chamber 12c respectively only makes a small contribution to this heat transfer. This realisation is based on trial computations. In FIG. 4, the result of such a computation is reproduced.

Referring to FIG. 4, the four curves A, B, P and E show the temperature curves in the cavity 31b of the equalising member 31 (curve A), in the cathode chamber 12b (curve B), in the plates 31a, 31c of the equalising member 31 (curve P) and in the electrochemically active structure 11 (curve E). For the sake of clarity, curve P applies for both plates 31a and 31c. (The two plates have temperature curves which are only slightly different.) The x axis is chosen along the direction of flow of the air in the cavity 31b (arrow A). The point a on the abscissa signifies the air inlet point of the equalising member 31 and point b signifies the change point where the air is diverted from the cavity 31b into the cathode chamber 12b and is returned towards the inlet point. The direction of the flow of the air is shown by the small arrows along curves A and B.

The arrows between the curves given in FIG. 4 represent the heat transport conditions corresponding to the arrows in FIG. 3. The left-hand half of the curve P is separated into arrows 34, by which heat conduction along the equalising member is shown (corresponding to arrows 34a and 34c). Arrow 34' signifies the heat flow which is absorbed by the heat exchange elements at the air inlet. This heat flow 34' corresponds to the proportion of the heat of reaction which is indirectly transferred from the equalising member 31 to the air 2b (FIG. 2). With the trial computation on which the diagram is based, the proportions of the indirectly and directly transferred amounts of heat were chosen to be almost the same size, which corresponds to an optimal mode of operation.

After the indirect heat transfer, the air enters the cavity 31b with the temperature $T_A$ (973°K), where the air is heated by the direct transfer of heat from the equalising member 31 to the temperature $T_B$ (1068°K). This temperature $T_B$ is only approximately 20°K under the reaction temperature $T_E$. In the cathode chamber 12b, the air temperature (curve B) only changes slightly. At first—with decreasing x-values—the temperature still rises, then stays practically constant and finally becomes somewhat lower. In the interval between points b and c, the air absorbs heat from the cathode 11a (arrows 16) and from the plate 31a (arrows 36); between c and d the air firstly absorbs heat from the cathode 11a and emits heat to the plate 31a; between d and a the air emits heat both to cathode 11a and also to plate 31a.

The electrochemical reaction takes place at roughly 1100°K, and a thermal output of approximately 1 kW/m² is released—with respect to both electrode surfaces. Because of the high reaction temperature a temperature difference of approximately 5°K is sufficient to transfer the heat of reaction by thermal radiation from the electrodes 11a and 11c to the adjacent plates 31a and 31c' respectively of the temperature equalising members 31. This temperature difference is shown too large in FIG. 4. As only a relatively small exchange of heat occurs between the electrodes and the contiguous air or the contiguous gas, it is possible, for example, that the air temperature can be higher than the electrode temperature: see the interval between a and d in the diagram of FIG. 4.

According to the trial computation, the maximum temperature difference in the electrochemcially active structure 11 is 17°K; the distance between the extreme points is 4 centimeters (cm). The temperature gradient—approximately 4K/cm—is therefore substantially smaller than in previously known fuel cells, where it is in the order of 50K/cm. Consequently, more moderate thermal stresses are produced, which the solid electrolytes 11b are more likely to withstand.

The following prerequisite has to apply with respect to the temperature gradients. To prevent excessive temperature gradients occurring at individual points on the ceramic electrolytic layers, the temperature equalising members have to have a sufficiently wide surface, over all of which they can absorb the thermal radiation emitted by the electrodes. Also, over the entire surface, the members must permit the transfer of heat and also equalize the temperatures. The equalising members 31 are advantageously manufactured from a metal alloy, which is resistant up to a temperature of 1100K in the presence of oxygen. However, the members can also be manufactured from a ceramic material, which is not such a good heat conductor; however, in this case, the plates 31a, 31c have to be sufficiently thick to guarantee the temperature equalization.

In the discussion on the thermal balance of the fuel cell with reference to FIG. 2, only the contribution of the gas stream with respect to secondary combustion was mentioned. The contribution to thermal balance with respect to the transport of sensitive heat is only of minor importance, as the quantity of heat entrained by the gas stream—compared at the same temperature differences—is smaller by more than ore order of magnitude than in the air stream. The gas has already been considerably preheated inside the battery on the way to the individual fuel cells. To improve the preheating of the gas even more, the gas inlet points can be constructed in a similar way as for the air as heat exchange elements, which also receive the heat to be transferred from the temperature equalising members.

Referring to FIG. 5, wherein like reference characters indicate like parts as above, a battery of fuel cells may be constructed in an annular manner. As illustrated, a plurality of fuel cells are disposed in a vertical stacked array with electrochemically active structures 11 disposed in alternating fashion with a plurality of temperature equalizing members 31. As illustrated, each heat equalizing member 11 is spaced from one structure 11 in order to define a flow path C or anode chamber 12c for a fuel gas therebetween while being spaced from another structure 11 to define a flow path B or cathode chamber 12b for a flow of air. As positioned, each member 31 is able to receive generated heat from a respective structure 11. In addition, each member 31 is formed of a pair of parallel spaced apart plates 31a, 31c to define a chamber 31b for a flow A of air.

The structures 11 and members 31 are of annular shape and extend about a central pipe 41 which is coaxial of the members 31. As indicated, the pipe 41 is made up of sections, each of which is integral with a member 31.

Each pipe section is also provided with a plurality of circumferentially disposed holes 42 through which a fuel gas 1 can be delivered. To this end, the pipe 41 and holes 42 serve as a means for directing a flow of fuel gas over the negative electrode of each structure 11. Further, a plurality of air inlets 46 communicate with the chamber 31b of each member 31 to serve as a means for directing a flow of air over the positive electrode of a respective structure 11. As illustrated, electrically insulating rings 43 are inserted between the segments of the central pipe 41. In addition, a sealing ring 44 is provided for a gas-tight separation of adjacent cells in the central region.

The central pipe 41 has proved successful as a heat exchanger, by which heat is transferred from the equalising member to the gas 1. The finer the holes 42, the better is the preheating of the gas 1 fed into the cells.

During operation, the fresh air 2b preheated in the external recuperator (not shown) travels via the pipe 46 into an annular duct 47 in each cell and is distributed over the circumference of the fuel cell and is also simultaneously heated by heat which is radially fed in from the equalising member 31. The distribution and heat exchange function may be improved by additional heat exchange elements, such as, for example, the rib 47a shown in FIG. 5. Instead of one pipe 46, several pipes may of course be disposed over the circumference of the fuel cell. The annular duct 47 serves as the heat exchange element at the air inlet point.

After the further heating in the cavity 31b, the air 2 enters the cathode chamber 12b centrally through a circular gap 46'. The used air 6 and the used gas 5 leave the fuel cells at the outer circumference of the cell stack. In an annulus between a housing wall (not illustrated) and the surface of the cell stack, the secondary combustion of the air 6 and of the gas 5 can take place directly after they leave the fuel cells. The gas 5 and the air 6 may of course be collected separately and only then may they be burnt externally.

When supplied to the inlet pipe 46, the fresh air 2b passes through hot regions on the surface of the cell stack, as a result of which additional heat absorption occurs. It is advisable to ensure equal inlet temperatures for all cells, so that as far as possible no temperature gradients occur in the axial direction of the stack. This requirement is met by the delivery pipes being designed and disposed in the hot regions in such a way that the additional heat absorption is the same or at least roughly the same for them all. Another solution is to keep this additional heat absorption small by means of thermal insulation.

In the exemplified embodiment shown in FIG. 5, the equalising member 31 together with a segment of the central pipe 41, with the inlet pipe 46 and with the annular duct 47, forms a unitary gas and feeding element for the fuel cell battery.

The method specified by the invention is explained with reference to a special exemplified embodiment of the fuel cell battery. However, the field of application of the technique is more general, as is shown with reference to FIG. 6 for a second exemplified embodiment wherein the air and gas flow in parallel ducts 12b and 12c, respectively, as in the known battery as shown in FIG. 1b. Therefore the temperature equalising members have to be constructed by two different elements, i.e. a tubular element 32 in the air duct 12b and a wireshaped element 33 in the gas duct 12c. At one end, the air duct 12b has to have a seal 49 so that the air supplied through the tubular element 32 (arrow A) is redirected to flow back again in the counter flow. The mode of operation of these elements 32 and 33 is similar to that of the equalising member 31 which has already been explained above. Heat is also dissipated against the direction of flow of the inflowing air into heat exhange elements (not shown), which form part of an internal recuperator.

The invention thus provides a relative simple structure for a fuel cell battery in which relatively small temperature gradients occur which are otherwise sensitive to thermal stresses. Further, the heat of reaction can be dissipated with a relative small amount of excess air and particular a smaller amount of excess air than in previously known techniques.

What is claimed is:

1. A method of dissipating heat from a battery of solid electrolytic fuel cells, said method comprising the steps of
    positioning a temperature equalizing member opposite a positive electrode of an electrochemically active structure of at least one fuel cell to receive generated heat therefrom during a conversion of chemical energy with electrical energy;
    dissipating a first part of the heat transferred to the temperature equalizing member indirectly to a flow of air via heat exchange elements;
    dissipating a second part of the heat transferred to the temperature equalizing member directly to the flow of air to heat the air to a temperature close to the temperature of reaction; and
    thereafter passing the flow of heated air to the positive electrode of the electrochemically active structure.

2. A method as set forth in claim 1 which further comprises the step of supplying a flow of oxygen having at most a three hold excess with the flow of air.

3. A method as set forth in claim 1 wherein said first and second parts are at least approximately equal.

4. A method as set forth in claim 1 wherein a flow a heated air of the same temperature is passed over a positive electrode of each of a plurality of fuel cells.

5. A method as set forth in claim 1 which further comprises the steps of passing a flow of fuel gas over the electrochemically active structure and dissipating a third part of the heat transferred to the temperature equalizing member to the flow of fuel gas to preheat the flow of fuel gas to preheat the flow of fuel gas.

6. In a fuel cell, the combination comprising
    at least one electrochemically active structure including a positive electrode a negative electrode and an electrolyte located between the at least one positive electrode and the at least one negative electrode;
a conductive temperature equalizing member disposed opposite said positive electrode in order to receive heat generated in said electrochemically active structure;
first means defining at least one flow path for the flow of air in said member remote from said positive electrode, said path being disposed to transfer one part of the heat transferred to said member directly to the flow of air;
a plurality of heat exchange elements positioned at an air inlet end of said member for preheating the flow of air by indirectly transferring to the flow of air another part of the heat transferred to said member; and
second means communicating with said first means and defining at least one flow path for the flow of heated air between said member and said positive electrode.

7. The combination as set forth in claim 6 wherein said member is in parallel with said positive electrode.

8. The combination as set forth in claim 6 wherein said member is made of a metal alloy resistant to heat of up to 1100°K in the presence of oxygen.

9. The combination as set forth in claim 6 wherein said first means include a plurality of parallel cavities in said member.

10. The combination as set forth in claim 9 wherein said second means includes a plurality of parallel cavities in said member.

11. In combination,
a plurality of electrochemically active structures disposed in stacked array, each structure including a positive electrode;
at least one heat conductive equalizing member disposed in spaced relation between said structures to receive generated heat, said member being spaced from one of said structures to define a flow path for a fuel gas therebetween and being spaced from a second of said structures to define a first flow path for air therebetween and to receive generated heat from said second structure, each member having a pair of parallel spaced apart plates defining a second flow path therebetween for a flow of air in communication with said first flow path;
an air inlet to said second flow path; and
heat exchanger elements adjacent said inlet for dissipating a part of the heat transferred to said member into the flow of air in said second flow path.

12. The combination as set forth in claim 11 wherein said structure and said members are of annular shape and which further comprises a central pipe coaxial of said members, said pipe having holes communicating with said flow path for a fuel gas to deliver a fuel gas thereto.

13. In combination,
an electrochemically active structure having a positive electrode and disposed between an air duct and a fuel gas duct;
a tubular element in said air duct for receiving heat generated from said structure and defining a flow path for a flow of air to be heated;
a seal at one end of said air duct for redirecting a flow of air exiting from said tubular element between said element and said positive electrode; and
a wire-shaped element in said fuel gas duct for receiving heat generated from said structure.

14. A fuel cell comprising
an electrochemically active structure including a positive electrode and a negative electrode;
means for directing a flow of fuel gas over said negative electrode;
means for directing a flow of air over said positive electrode;
a heat conductive temperature equalizing member for receiving heat generated in said structure and being disposed in heat exchange relation with the flow of air to preheat the flow of air prior to passage over said positive electrode; and
heat exchange elements between said member and the flow of air for preheating the flow of air.

* * * * *